(12) United States Patent
Wang et al.

(10) Patent No.: US 12,479,839 B2
(45) Date of Patent: Nov. 25, 2025

(54) CRYSTALLINE FORM OF ATR INHIBITOR AND USE THEREOF

(71) Applicant: Wuxi Biocity Biopharmaceutics Co., Ltd., Jiangsu (CN)

(72) Inventors: Jian Wang, Shanghai (CN); Ting Yao, Shanghai (CN); Wenyuan Qian, Shanghai (CN); Jian Li, Shanghai (CN); Shuhui Chen, Shanghai (CN)

(73) Assignee: Wuxi Biocity Biopharmaceutics Co., Ltd., Jiangsu (CN)

( * ) Notice: Subject to any disclaimer, the term of this patent is extended or adjusted under 35 U.S.C. 154(b) by 819 days.

(21) Appl. No.: 17/632,823

(22) PCT Filed: Aug. 6, 2020

(86) PCT No.: PCT/CN2020/107474
§ 371 (c)(1),
(2) Date: Feb. 4, 2022

(87) PCT Pub. No.: WO2021/023272
PCT Pub. Date: Feb. 11, 2021

(65) Prior Publication Data
US 2022/0281858 A1    Sep. 8, 2022

(30) Foreign Application Priority Data
Aug. 6, 2019    (CN) .......................... 201910722102.7

(51) Int. Cl.
*C07D 413/14*    (2006.01)

(52) U.S. Cl.
CPC ........ *C07D 413/14* (2013.01); *C07B 2200/13* (2013.01)

(58) Field of Classification Search
CPC .......................... C07D 413/14; C07B 2200/13
See application file for complete search history.

(56) References Cited

U.S. PATENT DOCUMENTS

| | | | |
|---|---|---|---|
| 7,893,063 B2 | 2/2011 | Pass | |
| 11,434,232 B2* | 9/2022 | Qian | .................... C07D 471/04 |
| 2020/0399260 A1 | 12/2020 | Qian et al. | |

FOREIGN PATENT DOCUMENTS

| | | |
|---|---|---|
| CN | 101010318 A | 8/2007 |
| CN | 103068391 A | 4/2013 |
| EA | 014706 B1 | 2/2011 |
| EA | 201201680 A1 | 11/2013 |
| WO | 2006005915 A1 | 1/2006 |
| WO | 2007070589 A2 | 6/2007 |
| WO | 2009093981 A1 | 7/2009 |
| WO | 2011154737 A1 | 12/2011 |
| WO | 2019036641 A1 | 2/2019 |
| WO | 2019050889 A1 | 3/2019 |
| WO | 2019154365 A1 | 8/2019 |

OTHER PUBLICATIONS

Papadakis, Emmanouil, Anjan K. Tula, and Rafiqul Gani. "Solvent selection methodology for pharmaceutical processes: Solvent swap." Chemical Engineering Research and Design 115 (2016): 443-461 (Year: 2016).*
Written Opinion issued Nov. 11, 2020 in PCT/CN2020/107474.
International Search Report issued Nov. 11, 2020 in PCT/CN2020/107474.
Sarma, Bipul, et al., "Solid forms of pharmaceuticals: Polymorphs, salts and cocrystals," Korean J. Chem. Eng., vol. 28 (2), pp. 315-322 (2011).
Caira, Mino R., "Crystalline Polymorphism of Organic Compounds," Topics in Current Chemistry, vol. 198, Springer Verlag Berlin Heidelberg (1998) 46 pages.
Variankaval, Narayan, et al., "From Form to Function: Crystallization of Active Pharmaceutical Ingredients," AIChE Journal, vol. 54, No. 7, pp. 1682-1688, Jul. 2008.
Mitkina, L.I., et al "Stress Studies and Photostability as a Part of Pharmaceutical Drug Development Data," Journal of the Scientific Medicament Testing Center, Moscow, 2015 (English Abstract Only).
English translation of Chinese Application No. 201910722102.7 filed Aug. 6, 2019 (22 pages).

* cited by examiner

*Primary Examiner* — James H Alstrum-Acevedo
*Assistant Examiner* — Carolyn L. Ladd
(74) *Attorney, Agent, or Firm* — Ice Miller, LLP

(57) ABSTRACT

Crystalline forms of an ATR inhibitor, preparation methods therefor, and the use thereof in the preparation of a drug for treating ATR-related diseases. In particular, crystalline forms of an ATR inhibitor represented by formula (I), physicochemical and biochemical properties of the same, preparation methods for, and uses of the same, in the preparation of a drug for treating ATR-related diseases.

(I)

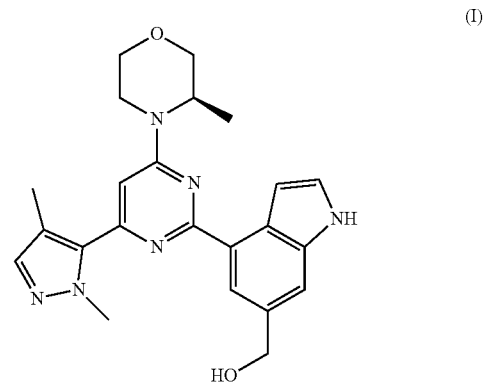

20 Claims, 2 Drawing Sheets

CRYSTALLINE FORM OF ATR INHIBITOR AND USE THEREOF

CROSS-REFERENCE TO RELATED APPLICATION

This application is a Section 371 of International Application No. PCT/CN2020/107474 filed Aug. 6, 2020, which was published in the Chinese language Feb. 11, 2021, under International Publication No. WO 2021/0232721 A1, which claims priority to Chinese Patent Application No. 201910722102.7 filed Aug. 6, 2019, the disclosures of which are incorporated herein by reference in their entireties.

TECHNICAL FIELD

Provided are crystal forms of an ATR inhibitor and preparation processes thereof and use for the manufacture of a medicament for treating an ATR-related disease.

BACKGROUND

ATR (Ataxia Telangiectasia-mutated and Rad3-Related protein kinase) belongs to the PIKKs (phosphatidylinositol-3-kinase-related kinase) family and participates in DNA damage repair to maintain gene stability. ATR protein kinase has a synergistic response on DNA damage, replication stress and cell cycle disturbances. ATR and ATM belong to the PIKK family of serine/threonine protein kinases, and they are common component of the cell cycle and DNA damage repairing, and other members include Chk1, BRCA1, p53. ATR is mainly responsible for DNA replication stress (duplication fork arrest) and repair of single strand break.

When the double-stranded DNA breaks or the replication fork arrests, ATR is activated by the single-stranded DNA structure. DNA polymerase stays in the process of DNA replication, and the replication helicase continues to unwind at the leading end of the DNA replication fork, resulting in the production of long single-stranded DNA (ssDNA), which is then bound by the single-stranded DNA and RPA (replication protein A). ATR/ATR acting protein complex is recruited by RPA upon replication stress or DNA damage to the damage site, RPA-single-stranded DNA complex activates the RAD17/rfc2-5 complex to bind to the damage site. DNA-ssDNA junction activates Rad9-HUS-RAD1 (9-1-1) heterotrimer, 9-1-1 in turn recruits TopBP1 to activate ATR. Once ATR is activated. ATR promotes DNA repair through downstream targets, stabilizing and restarting arrested replication forks and transient cell cycle arrest. These functions are achieved by ATR via mediating the downstream target Chk1. ATR acts as checkpoint for DNA damage in the cell cycle during S phase. It can mediate the degradation of CDC25A through Chk1, thereby delaying the DNA replication process and providing time to repair the replication fork. ATR is also the main regulator of G2/M cell cycle checkpoint, preventing cells from entering mitosis prematurely before DNA replication is completed or DNA damage. This ATR-dependent G2/M cell cycle arrest is mainly mediated by two mechanisms: 1. Degradation of CDC25A; 2. Phosphorylation of Cdc25C by Chk1 to bind to 14-3-protein. The binding of Cdc25C to 14-3-3 protein promotes its export from the nucleus and cytoplasmic isolation, thereby inhibiting its ability to dephosphorylate and activate nuclear Cdc2, which in turn prevents entry into mitosis.

ATR gene mutations are very rare, and only few patients with Seckel syndrome have ATR gene mutations, which are characterized by stunting and microcephaly. Disruption of ATR-related pathways can lead to genome instability, and ATR protein is activated by most cancer chemotherapy. In addition, the duplication of the ATR gene has been described as a risk factor for rhabdomyosarcoma.

ATR is essential for cell self-replication and is activated in the S phase to regulate the origin of replication and repair damaged replication forks. Damage to the replication forks can increase the sensitivity of cancer cells to platinum and hydroxyurea anticancer agents and reduce the resistance of cancer cells. Therefore, inhibiting ATR may be an effective method in cancer treatment in the future.

SUMMARY

Provided is a Crystal Form A of the compound of formula (I), the Crystal Form A has an X-ray powder diffraction (XRPD) pattern having characteristic diffraction peaks at the following 2θ angles: 8.10±0.20°, 18.33±0.20° and 22.63±0.20°.

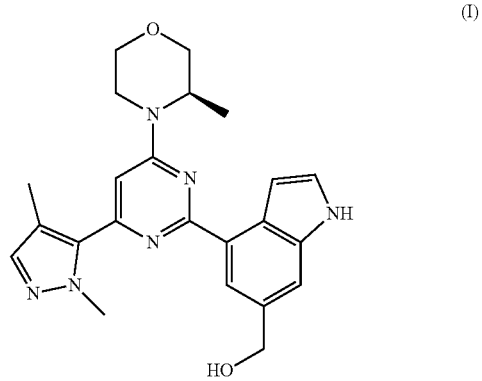 [SMILES: Cc1cnn(C)c1-c1cc(N2CCOC[C@H]2C)nc(-c2cc(CO)cc3[nH]ccc23)n1]

(I)

In some embodiments according to the present disclosure, the Crystal Form A has an X-ray powder diffraction (XRPD) pattern having characteristic diffraction peaks at the following 2θ angles: 7.46±0.20°, 8.10±0.20°, 13.03±0.20°, 15.07±0.20°, 15.58±0.20°, 16.19±0.20°, 18.33±0.20° and 22.63±0.20°.

In some embodiments according to the present disclosure, the Crystal Form A has an X-ray powder diffraction (XRPD) pattern having characteristic diffraction peaks at the following 2θ angles: 7.46±0.20°, 8.10±0.20°, 13.03±0.20°, 13.46±0.20°, 15.07±0.20°, 15.58±0.20°, 16.19±0.20°, 18.33±0.20°, 21.17±0.20° and 22.63±0.20°.

In some embodiments according to the present disclosure, the Crystal Form A has an X-ray powder diffraction (XRPD) pattern having characteristic diffraction peaks at the following 2θ angles: 7.46°, 8.10°, 11.24°, 13.03°, 13.46°, 15.07°, 15.58°, 15.98°, 16.19°, 17.70°, 18.33°, 19.60°, 21.17°, 22.63°, 23.84°, 25.56° and 26.57°.

In some embodiments according to the present disclosure, the Crystal Form A has an XRPD pattern as shown in FIG. 1.

In some embodiments according to the present disclosure, the Crystal Form A has an XRPD pattern with Analysis Data shown in Table 1:

TABLE 1

XRPD Pattern Analysis Data of Crystal Form A

| No. | 2θ angle (°) | Inter-planar spacing (Å) | Peak Height [cts] | Relative Intensity (%) |
|---|---|---|---|---|
| 1 | 7.46 | 11.85 | 269.54 | 10.16 |
| 2 | 8.10 | 10.92 | 2653.98 | 100.00 |
| 3 | 11.24 | 7.87 | 50.84 | 1.92 |
| 4 | 13.03 | 6.79 | 234.60 | 8.84 |
| 5 | 13.46 | 6.58 | 220.36 | 8.30 |
| 6 | 15.07 | 5.88 | 454.97 | 17.14 |
| 7 | 15.58 | 5.69 | 358.73 | 13.52 |
| 8 | 15.98 | 5.55 | 440.38 | 16.59 |
| 9 | 16.19 | 5.48 | 563.23 | 21.22 |
| 10 | 17.70 | 5.01 | 123.10 | 4.64 |
| 11 | 18.33 | 4.84 | 593.05 | 22.35 |
| 12 | 19.60 | 4.53 | 54.26 | 2.04 |
| 13 | 21.17 | 4.20 | 229.79 | 8.66 |
| 14 | 22.63 | 3.93 | 610.20 | 22.99 |
| 15 | 23.84 | 3.73 | 150.71 | 5.68 |
| 16 | 25.56 | 3.49 | 81.84 | 3.08 |
| 17 | 26.57 | 3.35 | 108.56 | 4.09 |

Provided is a Crystal Form B of a compound of formula (I), wherein the Crystal Form B has an X-ray powder diffraction (XRPD) pattern having characteristic diffraction peaks at the following 2θ angles: 8.45±0.20°, 10.87±0.20° and 20.56±0.20°.

In some embodiments according to the present disclosure, the Crystal Form B has an X-ray powder diffraction (XRPD) pattern having characteristic diffraction peaks at the following 2θ angles: 8.45±0.20°, 10.87±0.20°, 14.83±0.20°, 15.54±0.20°, 17.33±0.20°, 20.56±0.20°, 22.00±0.20° and 22.638±0.20°.

In some embodiments according to the present disclosure, the Crystal Form B has an X-ray powder diffraction (XRPD) pattern having characteristic diffraction peaks at the following 2θ angles: 8.45±0.20°, 10.87±0.20°, 14.83±0.20°, 15.54±0.20°, 17.33±0.20°, 20.08±0.20°, 20.56±0.20°, 22.00±0.20°, 22.63±0.20° and 25.26±0.20°.

In some embodiments according to the present disclosure, the Crystal Form B has an X-ray powder diffraction (XRPD) pattern having characteristic diffraction peaks at the following 2θ angles: 8.45°, 9.20°, 10.87°, 12.57°, 14.14°, 14.53°, 14.83°, 15.54°, 16.80°, 17.33°, 18.43°, 19.84°, 20.08°, 20.56°, 21.39°, 22.00°, 22.44°, 22.63°, 23.26°, 25.26°, 25.85° and 26.98°.

In some embodiments according to the present disclosure, the Crystal Form B has an XRPD pattern as shown in FIG. 2.

In some embodiments according to the present disclosure, the Crystal Form B has an XRPD pattern with Analysis Data shown in Table 2:

TABLE 2

XRPD Pattern Analysis Data of Crystal Form B

| No. | 2θ angle (°) | Inter-planar spacing (Å) | Peak Height [cts] | Relative Intensity (%) |
|---|---|---|---|---|
| 1 | 8.45 | 10.47 | 6122.78 | 46.61 |
| 2 | 9.20 | 9.62 | 230.71 | 1.76 |
| 3 | 10.87 | 8.14 | 5097.37 | 38.80 |
| 4 | 12.57 | 7.04 | 196.72 | 1.50 |
| 5 | 14.14 | 6.26 | 330.21 | 2.51 |
| 6 | 14.53 | 6.10 | 2326.39 | 17.71 |
| 7 | 14.83 | 5.97 | 2921.87 | 22.24 |
| 8 | 15.54 | 5.70 | 3353.73 | 25.53 |
| 9 | 16.80 | 5.28 | 127.81 | 0.97 |
| 10 | 17.33 | 5.12 | 1550.97 | 11.81 |
| 11 | 18.43 | 4.81 | 127.76 | 0.97 |
| 12 | 19.84 | 4.48 | 505.61 | 3.85 |
| 13 | 20.08 | 4.42 | 1930.70 | 14.70 |
| 14 | 20.56 | 4.32 | 13137.09 | 100.00 |
| 15 | 21.39 | 4.15 | 482.03 | 3.67 |
| 16 | 22.00 | 4.04 | 2057.14 | 15.66 |
| 17 | 22.44 | 3.96 | 2064.89 | 15.72 |
| 18 | 22.63 | 3.93 | 1791.66 | 13.64 |
| 19 | 23.26 | 3.82 | 1209.28 | 9.21 |
| 20 | 25.26 | 3.53 | 1512.61 | 11.51 |
| 21 | 25.85 | 3.45 | 377.13 | 2.87 |
| 22 | 26.98 | 3.30 | 280.24 | 2.13 |

In some embodiments according to the present disclosure, the Crystal Form B has a Differential Scanning Calorimetry curve (DSC) having one onset point of endothermic peak at 174.3±3° C.

In some embodiments according to the present disclosure, the Crystal Form B has a DSC pattern as shown in FIG. 3.

In some embodiments according to the present disclosure, the Crystal Form B has a Thermogravimetric Analysis curve (TGA), wherein the weight loss at 150° C.±3° C. is 1.49%.

In some embodiments according to the present disclosure, the Crystal Form B has a TGA pattern as shown in FIG. 4.

Provided is a process for preparing a Crystal Form A of a compound of formula (I), comprising:
1) adding the compound of formula (I) into ethanol solvent;
2) adding water,
3) stirring for 100-120 h
4) performing recrystallization at room temperature to obtain the Crystal Form A.

Provided is a process for preparing a Crystal Form B of a compound of formula (I), comprising:
1) adding the compound of formula (I) into a solvent;
2) heating to a temperature with stirring for 2.5-120 h;
3) performing recrystallization at room temperature to obtain the Crystal Form B.

In some embodiments according to the present disclosure, the solvent is: methanol, methyl tertiary butyl ether, methanol/water (V/V, 1:0.3-1), acetone/water (V/V, 1:1), isopropanol/water (V/V, 1:1), ethyl acetate/n-heptane (V/V, 1:1), isopropyl acetate/n-heptane (V/V, 1:1), ethanol/n-heptane (V/V, 1:1), acetonitrile/n-heptane (V/V, 1:1), isopropanol/n-heptane (V/V, 1:1) or dichloromethane/n-heptane (V/V, 1:1).

In some embodiments according to the present disclosure, the temperature is 25-70° C.

Provided is a process for preparing a Crystal Form B of a compound of formula (I), comprising:
1) adding the compound of formula (I) into alcohol solvent;
2) adding water,
3) stirring for 15-20 h;
4) performing recrystallization at room temperature to obtain the Crystal Form B.

In some embodiments according to the present disclosure, the volume ratio of the alcohol solvent and water is 1:1-1:4.

In some embodiments according to the present disclosure, the alcohol solvent is selected from the group consisting of methanol.

In some embodiments according to the present disclosure, the concentration range of the compound of formula (I) is selected from the group consisting of 25 mg/mL-50 mg/mL.

Provided is also use of the compound of formula (I), the Crystal Form A or the Crystal Form B for the manufacture of a medicament for treating an ATR associated disease.

In some embodiments according to the present disclosure, the medicament is for use in treating a solid tumor or a blood tumor.

In some embodiments according to the present disclosure, the medicament is for use in treating colorectal cancer, gastric cancer, esophageal cancer, primary peritoneal carcinoma, adrenocortical carcinoma, renal clear cell carcinoma, prostate cancer, bladder urothelial carcinoma, ovarian cancer, breast cancer, endometrial carcinoma, fallopian tube carcinoma, non-small cell lung cancer or small cell lung cancer.

Technical Effect

The Crystal Form A and Crystal Form B of the compound of formula (I) according to the present disclosure are stable, are less affected by light, heat and humidity, have good drug efficacy in vivo, and are promising for drugability.

Definition and Description

Unless stated otherwise, the following terms and phrases have the following definitions. A specific term or phrase should not be considered as indefinite or unclear without specific definition and should be understood according to the normal meanings. A tradename used herein shall refer to the corresponding article or the active ingredient.

The intermediate compounds herein can be prepared by various synthesis processes well-known to a person skilled in the art, including the specific embodiments listed below, the embodiments by a combination with other chemical synthesis processes, and equivalent alternatives well known to a person skilled in the art. The preferable embodiments include but are not limited to the Examples below.

The chemical reaction of the specific embodiments is performed in a suitable solvent, and the solvent should be suitable for the chemical changes of the present disclosure and the required reagents and materials. To obtain the compound of the present disclosure, a person skilled in the art can modify or select a synthesis step or a reaction scheme based on the available embodiments.

The present disclosure will be described in a detailed manner and the Examples should be not considered as limitation thereto.

The solvents used herein are commercially available and can be used without further purification.

The solvents used herein can be commercially available. The following abbreviations are used herein: EtOH represents ethanol; MeOH represents methanol; TFA represents trifluoroacetic acid; TsOH represents p-toluenesulfonic acid; mp represents melting point; $EtSO_3H$ represents ethanesulfonic acid; $MeSO_3H$ represents methanesulfonic acid; THF represents tetrahydrofuran; EtOAc represents ethyl acetate.

X-Ray Powder Diffractometer (XRPD)
Device:
  Testing method: about 10-20 mg of sample is used for XRPD detection.
  Detailed XRPD parameters are as follows:
  Radiation source: Cu, kα (Kα1=1.540598 Å, Kα2=1.544426 Å, Kα2/Kα1 intensity ratio: 0.5)
  Light tube voltage: 45 kV, Light tube current: 40 mA
  Divergence slit: fixed ⅛ deg
  $1^{st}$ soller slit: 0.04 rad
  $2^{nd}$ soller slit: 0.04 rad
  Receiving slit: none
  Anti-scatter slit: 7.5 mm
  Measuring time: 5 min
  Scanning angle range: 3-40 deg
  Step width angle: 0.0263 deg
  Time/step: 46.665 sec
  Sample plate speed: 15 rpm
Differential Scanning Calorimeter (DSC)
  Device: TA Q200/Q2000/2500 Differential Scanning Calorimeter
  Testing method: The sample (about 1-5 mg) is placed in DSC aluminum plate for testing, under 50 mL/min $N_2$, and is heated from 25° C. (room temperature) until decomposition at the heating rate of 10° C./min.
Thermal Gravimetric Analyzer (TGA)
  Device: TA Q5000/5500 Thermal Gravimetric Analyzer
  Testing method: The sample (about 1-5 mg) is placed in TGA aluminum plate for testing, under 10 mL/min $N_2$, and is heated from room temperature to 350° C. at the heating rate of 10° C./min.

DETAILED DESCRIPTION

Figure 1:
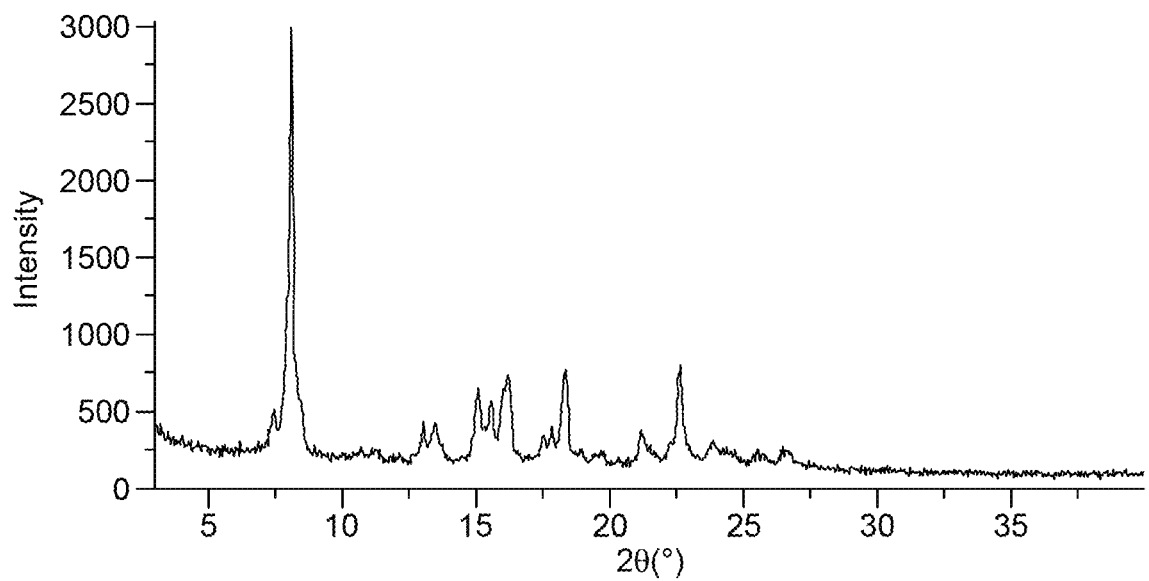
FIG. 1 shows the XRPD pattern at Cu-Kα radiation of the Crystal Form A of the compound of Formula (I)

For better understanding of the present disclosure, further description will be provided below by reference to the specific examples, which are not any limitation thereto.

Example 1: Preparation of the Compound of Formula (I)

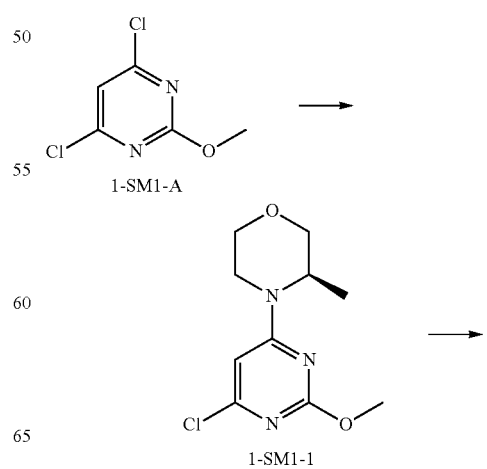

-continued

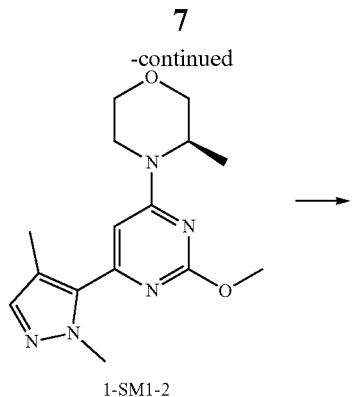

1-SM1-2

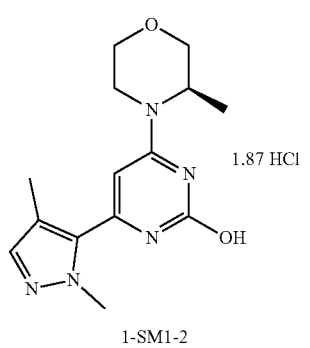

1-SM1-2

Step 1: Preparation of Compound 1-SM1-2

4.0 L of dimethyl sulphoxide was added into a 50 L tank reactor at room temperature, to which were added 1-SM1-A (1500.69 g, 8.39 mol), (R)-3-Methylmorpholine (854.97 g, 8.45 mol), potassium carbonate (2891 g, 20.92 mol) successively, and then 6.0 L of dimethyl sulphoxide was added again for dilution. After addition, the reaction system was stirred at 95° C. for 3 h. After detection of complete conversion to 1-SM1-1, the temperature was lowered to 45° C. and the tank reactor was purged with nitrogen for 5 min and then added with 1,4-dimethylpyrazole-5-boronic acid pinacol ester (1952.44 g, 8.79 mol), Tetrakis(triphenylphosphine)paladium (192.98 g, 0.167 mol). After addition, 2.0 L of dimethyl sulphoxide was added to rinse the inner wall, and then stirring was performed for 12 h at 104° C. under nitrogen atmosphere. After the reaction was completed, the temperature was lowered to 40° C., and the reaction system was filtered. The filter cake was rinsed with 20.0 L of ethyl acetate, and the filtrate was poured into the reactor. 15.0 L of water was added into the reactor, and the reaction system was stirred for 2 min and allowed to stand for liquid separation. The aqueous phase was extracted again with 10.0 L of ethyl acetate, and the organic phases were combined, washed with water (10.0 L), saturated brine (8.0 L*2), respectively. The organic phases were concentrated to give the crude Compound 1-SM1-2 directly for the next reaction.

MS m/z: 304.0 [M+H]$^+$

Step 2: Preparation of Compound 1-SM1

Hydrogen chloride (1344.0 g, 36.82 mol) was passed into 6.0 L of 1,4-dioxane at −40° C. for further use. 5.0 L of 1,4-dioxane was added into a 50 L tank reactor. The crude product 1-SM1-2 obtained by concentration was dissolved in 5.0 L of 1,4-dioxane and added into the reactor, to which was added 15.0 L of 1,4-dioxane for dilution under stirring. The temperature was raised to 70° C., and to the reaction liquid was slowly added the above-mentioned hydrochloric acid/1,4-dioxane (1344 g, 6.0 L) and reaction was performed at 98° C. for 15 h. The temperature was lowered to 40° C. and the reaction system was filtered. The filter cake was rinsed with 15.0 L of ethyl acetate, and the solid was poured into a tank reactor and slurried with 15.0 L of ethyl acetate for 30 min. The reaction system was filtered, and the filter cake was rinsed with 5.0 L of ethyl acetate. The solid was dried in a vacuum drying cabinet to give Compound 1-SM1.

MS m/z: 290.1 [M+H]$^+$ $^1$H NMR (400 MHz, DMSO-d$_6$) δ ppm 1.34 (br d, J=6.52 Hz, 3H) 2.08 (s, 3H) 3.47-3.58 (m, 2H) 3.64-3.70 (m, 1H) 3.72-3.78 (m, 1H) 3.87 (s, 3H) 3.97 (br s, 1H) 4.07-4.32 (m, 1H) 4.47 (br s, 1H) 6.61 (s, 1H) 7.44 (s, 1H)

Step 3: Preparation of Compound 1-SM2

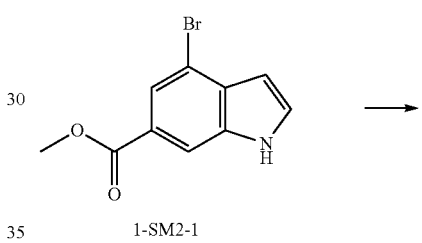

1-SM2-1

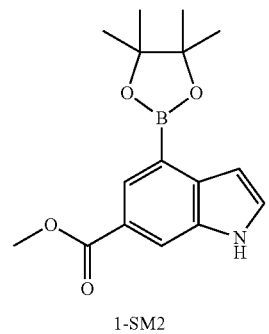

1-SM2

To a solution of compound 1-SM2-1 (2 g, 7.87 mmol), Bis(pinacolato)diboron (4.00 g, 15.74 mmol) and [1,1'-Bis(diphenylphosphino)ferrocene]dichloropalladium(II) (0.3 g, 410.00 μmol) in 1,4-dioxane (25.0 mL) was added potassium acetate (2.32 g, 23.61 mmol) and the reaction system was purged with nitrogen for three times. The reaction system was heated at 100° C. with stirring for 8 h and filtered. The solution was concentrated to give the crude product which was separated with column chromatography to give Compound 1-SM2.

MS-ESI m/z: 302.1 [M+H]$^+$.

Step 4: Preparation of Compound 1-1

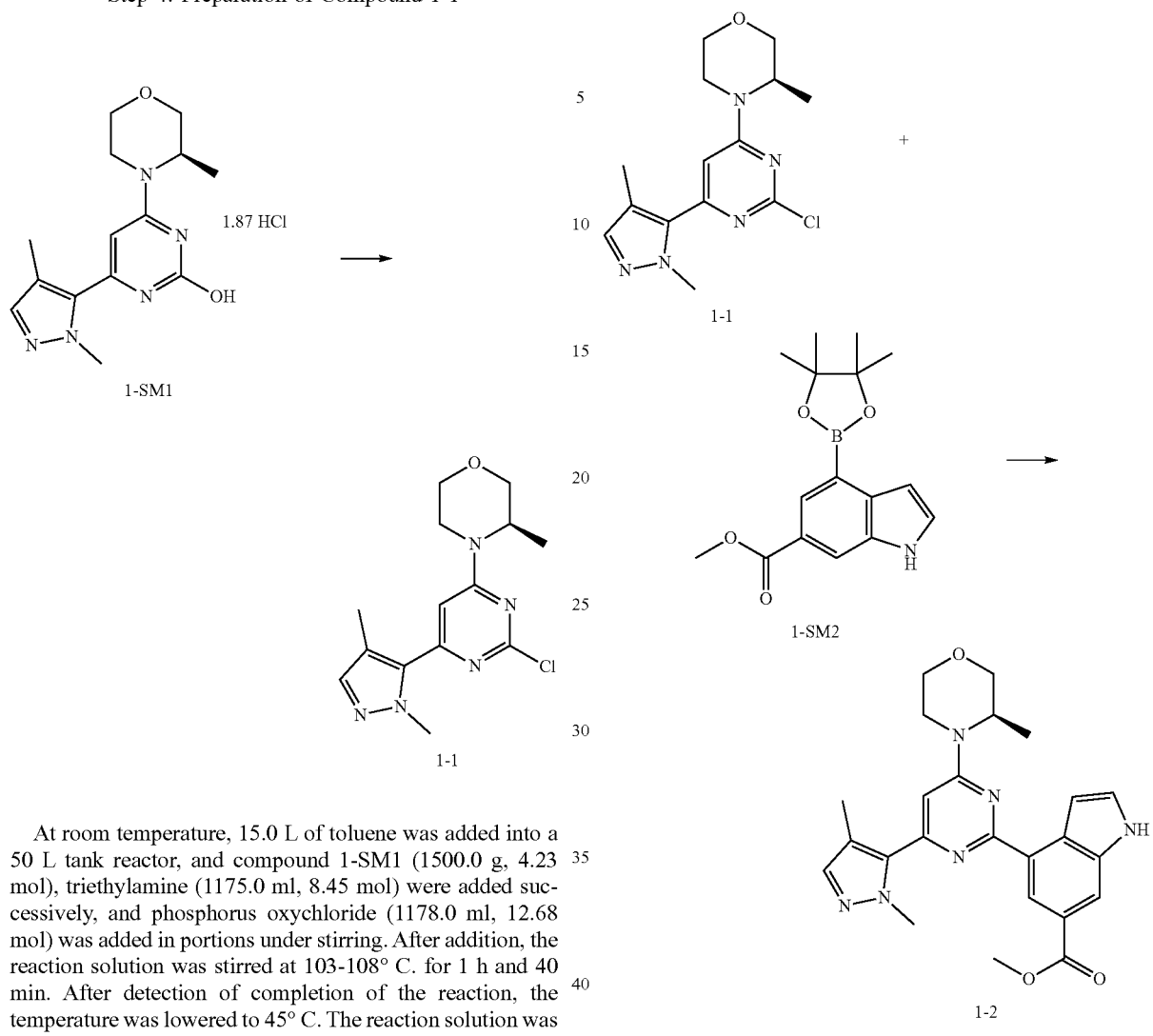

At room temperature, 15.0 L of toluene was added into a 50 L tank reactor, and compound 1-SM1 (1500.0 g, 4.23 mol), triethylamine (1175.0 ml, 8.45 mol) were added successively, and phosphorus oxychloride (1178.0 ml, 12.68 mol) was added in portions under stirring. After addition, the reaction solution was stirred at 103-108° C. for 1 h and 40 min. After detection of completion of the reaction, the temperature was lowered to 45° C. The reaction solution was transferred to a temporary storage tank and 15.0 L of purified water was added into the tank reactor. Under stirring, the reaction solution was added into the purified water in portions, with the temperature controlled at 20-40° C. After addition, the pH was adjusted to 6-7 with 12.0 L of aqueous sodium hydroxide solution (4M) and the temperature was controlled at 20-40° C. After adjusting the pH, 7.5 L of ethyl acetate was added into the tank reactor with stirring evenly for layering. The water phase was extracted with 15.0 L of ethyl acetate. The organic phases were combined, washed with 12.0 L of saturated brine, concentrated under reduced pressure to no fraction to give the crude product. The crude product was dissolved with 1.5 L of methyl tertiary butyl ether, to which was added 12.0 L of n-heptane in portions with stirring, and the mixture was stirred for 5 min and filtered. The filter cake was rinsed with 5.0 L of n-heptane, and the solid was placed in a tray and allowed to be dried spontaneously to give Compound 1-1.

MS m/z: 308.0 [M+H]$^+$ $^1$H NMR (400 MHz, DMSO-d$_6$) δ ppm 1.29 (br d, J=6.78 Hz, 3H) 2.17 (s, 3H) 3.24-3.32 (m, 1H) 3.52 (br s, 1H) 3.63-3.69 (m, 1H) 3.78 (br d, J=11.54 Hz, 1H) 3.96 (s, 3H) 4.01 (br s, 1H) 4.14 (br s, 1H) 4.47 (br s, 1H) 6.89 (s, 1H) 7.42 (s, 1H)

Step 5: Preparation of Compound 1-2

At 20-30° C. under nitrogen protection, 2.1 L of dimethyl sulfoxide was added into a 10 L glass kettle with stirring, to which were added Compound 1-1 (0.21 kg), Compound 1-SM2 (0.306 kg), aqueous sodium carbonate solution (1.3 M, 1.05 L), [1,1'-Bis(diphenylphosphino)ferrocene]dichloropalladium (II) (0.00749 kg) successively with an addition funnel. The reaction system was heated to an internal temperature of 60-70° C., and the temperature was maintained for 4-16 h. The system was cooled to 40-45° C., to which was added dropwise 5.25 L of water within 30 min, and then stirred for 30 min. The system was filtered with suction and the filter cake was washed with 2.1 L of water. Drying under vacuum at 45° C. gave the crude product. To the crude product obtained in the previous stage was added 2.625 L of ethyl acetate. After stirred evenly to dissolution, 10.5 L of methyl tertiary butyl ether was added again with further stirring for 30 min. After filtration with Buchner funnel covered with celite, the celite layer was washed again with a mixed solution of 2.1 L of ethyl acetate and methyl tertiary butyl ether (volume ratio 1:4). The filtrates were combined, and the organic phase was concentrated to give a concentrate. The upper black filter cake of celite was collected, to which was added 1.5 L of ethyl acetate. After stirring at room temperature for 1 h, filtration was performed with a Buchner funnel covered with celite, the filter cake was washed with 0.5 L of ethyl acetate, and the filtrate was concentrated. The concentrates obtained in previous two stages were combined.

To the previously obtained concentrate was added 1.5 L of ethyl acetate for dissolution, and then slowly added dropwise to 4.5 L solution of n-heptane under stirring (1.5 h), and then further stirred for 2 h. The system was filtered, and the filter cake was washed with a mixed solution of 0.4 L of ethyl acetate and n-heptane (volume ratio 1:3). After drying under vacuum, the filter cake was added into a 2 L one-neck flask, to which was added 0.8 L of isopropyl acetate. After reflux for 4 h, the reaction system was slowly cooled to room temperature and stirred overnight. The reaction system was filtered with a Buchner funnel, and the filter cake was washed with 0.3 L of isopropyl acetate. The solid was collected and dried under vacuum to give the product.

The product was dissolved in 4.2 L of ethyl acetate, and 42 g of activated carbon was added under stirring. The reaction system was stirred overnight under reflux, filtered while hot, and filtered through a Buchner funnel covered with celite. The celite layer was washed again with 2.0 L of ethyl acetate and the filtrates were combined. The organic phase was concentrated to 3.0 L. 1.2 L of ethyl acetate and 43 g of activated carbon were added to the above organic phase, which was stirred under reflux for 8 h and then filtered while hot. The reaction system was filtered through a Buchner funnel covered with celite. The celite layer was washed with 2.0 L of ethyl acetate, and filtrates were combined. The organic phase was concentrated and dried under vacuum to give Compound 1-2.

MS m/z: 447.0 [M+H]$^+$ $^1$H NMR (CHCl$_3$-d, 400 MHz): δ=8.98 (d, J=1.3 Hz, 1H), 8.57 (br s, 1H), 8.27 (s, 1H), 7.58 (d, J=2.0 Hz, 1H), 7.49 (t, J=2.8 Hz, 1H), 7.42 (s, 1H), 6.50 (s, 1H), 4.48 (br s, 1H), 4.29 (br d, J=12.5 Hz, 1H), 4.17 (s, 3H), 4.13 (dd, J=11.9, 2.9 Hz, 1H), 3.98 (s, 3H), 3.87-3.93 (m, 1H), 3.80-3.87 (m, 1H), 3.69 (td, J=11.9, 3.0 Hz, 1H), 3.44 (td, J=12.8, 3.8 Hz, 1H), 2.25 (s, 3H), 1.44 ppm (d, J=7.0 Hz, 3H)

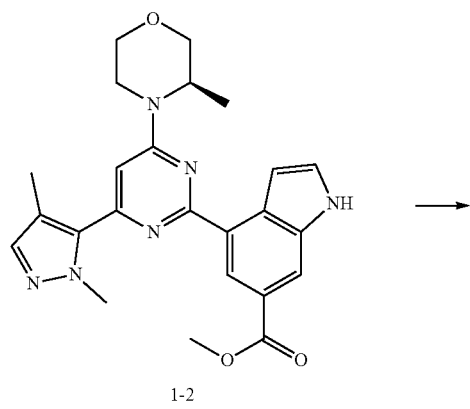

1-2

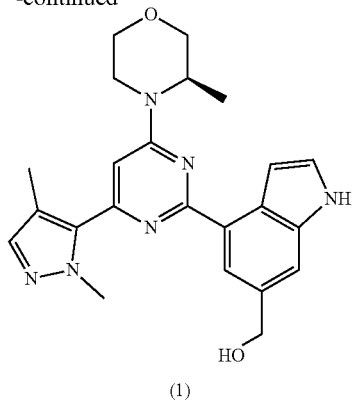

(1)

Step 6: Preparation of Compound of Formula (1)

At 20° C., lithium aluminum hydride (63.0 mL, 2.5M) was added to Compound 1-2 (35.0 g, 78.39 mmol) in tetrahydrofuran (50.0 mL), and the reaction system was stirred at 20° C. for 1 h. At 0-5° C., 6.9 mL of water, 6.9 mL of 15% sodium hydroxide and 20.7 mL of water were slowly added into the reaction solution successively, which was then filtered. The filtrate was concentrated to give the crude product, which was separated by column chromatography (ethyl acetate/petroleum ether 50-100%) to give the product. The above product was dissolved in 20.0 mL of dimethyl sulfoxide at rom temperature, slowly added dropwise into 400 mL of stirred water, filtered and dried to give the compound of formula (I).

MS m/z: 419.1 [M+H]$^+$ $^1$H NMR (400 MHz, CHCl$_3$-d) δ ppm 8.39 (br s, 1H), 8.28 (s, 1H), 7.58 (s, 1H), 7.51 (br s, 1H), 7.42 (s, 1H), 7.35 (t, J=2.76 Hz, 1H), 6.49 (s, 1H), 4.89 (s, 2H), 4.51 (br s, 1H), 4.30 (br d, J=14.05 Hz, 1H), 4.11-4.18 (m, 4H), 3.81-3.94 (m, 2H), 3.70 (td, J=11.86, 3.14 Hz, 1H), 3.44 (td, J=12.86, 3.89 Hz, 1H), 2.26 (s, 3H), 1.45 (d, J=6.78 Hz, 3H)

Example 2: Preparation of Crystal Form a of the Compound of Formula (1)

About 500.0 mg of the compound of formula (I) was weighed and dissolved in 5 mL of ethanol, to which was added dropwise 15 mL of purified water. After addition, the reaction system was placed on a magnetic stirrer (20° C.) and stirred for 120 h. The suspension was filtered to give a solid, which was dried overnight in a vacuum drying cabinet to give Crystal Form A of the compound of formula (I).

$^1$H NMR (400 MHz, CHCl$_3$-d) δ=8.39 (br s, 1H), 8.25 (d, J=1.3 Hz, 1H), 7.53 (s, 1H), 7.49 (t, J=2.3 Hz, 1H), 7.40 (s, 1H), 7.31 (t, J=2.8 Hz, 1H), 6.46 (s, 1H), 4.86 (s, 2H), 4.48 (br d, J=4.8 Hz, 1H), 4.28 (br d, J=12.5 Hz, 1H), 4.15-4.07 (m, 4H), 3.91-3.86 (m, 1H), 3.84-3.79 (m, 1H), 3.67 (dt, J=3.0, 11.9 Hz, 1H), 3.42 (dt, J=3.9, 12.9 Hz, 1H), 2.23 (s, 3H), 1.42 (d, J=7.0 Hz, 3H)

Example 3: Preparation of Crystal Form B of the Compound of Formula (1)

About 100 mg of the compound of formula (1) were added into different glass bottles, to which were added appropriate amounts of organic solvents or solvent mixtures (Table 3). The above samples were stirred in a constant temperature mixer (40° C.) (see Table 3 for stirring time) (protection from light). Then, the solid was filtered and placed in a vacuum drying cabinet (40° C.) for drying overnight. All the treatments gave Crystal Form B.

TABLE 3

Various appropriate amounts of organic solvents and stirring time

| Solvent (mL) | Stirring Time (h) |
|---|---|
| Acetone 0.7 + Water 0.7 | 120 |
| Isopropanol 1 + Water 1 | 72 |
| Methanol 1 + Water 1 | 120 |
| Methyl tertiary butyl ether 1 | 72 |
| Ethyl acetate 1 + n-heptane 1 | 120 |
| Isopropyl acetate 1 + n-heptane 1 | 120 |
| Ethanol 1 + n-heptane 1 | 120 |
| Acetonitrile 1+ n-heptane 1 | 120 |
| Isopropanol 1 + n-heptane 1 | 120 |
| Dichloromethane 2 + n-heptane 2 | 120 |

Example 4: Preparation of Crystal Form B of the Compound of Formula (1)

The compound of formula (1) (see Table 4 for mass) was slowly added into methanol solvent at (60-70° C.) (see Table 4 for volume), and then water was slowly added (see Table 4 for volume). After stirring for 0.5 h at 60° C., the temperature was lowered to 55° C. and stirred for 0.5 h. Then, the temperature was lowered to 50° C. and stirred for 0.5 h. Then, the temperature was lowered to 45° C. and stirred for 0.5 h. Then, the temperature was lowered to 40° C. and stirred for 0.5 h. Then, the temperature was lowered to 35° C. and stirred for 0.5 h. Then, the temperature was lowered to 30° C. and stirred for 0.5 h. Then, the temperature was lowered to 20-25° C. and stirred for 10 h. The solid was filtered to give Crystal Form B.

TABLE 4

Various appropriate amounts of organic solvents and stirring time

| Compound of formula (1) (g) | Solvent (mL) | Stirring time (h) |
|---|---|---|
| 3 | Methanol 30 | 13.5 |
| 2 | Methanol 40 + Water 40 | 13.5 |
| 2 | Methanol 40 + Water 20 | 13.5 |
| 2 | Methanol 40 + Water 13.3 | 13.5 |

Example 5: Preparation of Crystal Form B of the Compound of Formula (1)

Experimental procedure: About 5.5 g of the compound of formula (1) was slowly added into 50 mL of methanol solvent at (60-70° C.). After stirring at 60° C. for 0.5 h, the temperature was lowered to 25° C. and stirred for 2 h, and the solid was filtered to give Crystal Form B.

Example 6: Preparation of Crystal Form B of the Compound of Formula (1)

900.0 g of the compound of formula (I) was dissolved in 9.0 L of methanol, to which was added slowly dropwise 9.0 L of purified water at room temperature (25° C.). The reaction system was further stirred for 20 h and filtered under reduced pressure. The filter cake was washed with 6.0 L of purified water and the solid was dried under vacuum to give Crystal Form B of compound of formula (I).

MS m/z: 419.0 [M+H]$^+$ $^1$H NMR (CHCl$_3$-d, 400 MHz): δ=8.60 (br s, 1H), 8.21 (s, 1H), 7.45 (br s, 1H), 7.42 (br s, 1H), 7.40 (s, 1H), 7.25 (br d, J=2.5 Hz, 1H), 6.45 (s, 1H), 4.81 (br s, 2H), 4.47 (br d, J=5.8 Hz, 1H), 4.27 (br d, J=13.8 Hz, 1H), 4.07-4.13 (m, 4H), 3.85-3.91 (m, 1H), 3.78-3.84 (m, 1H), 3.66 (td, J=11.9, 3.0 Hz, 1H), 3.41 (td, J=12.8, 3.8 Hz, 1H), 2.22 (s, 3H), 1.41 ppm (d, J=6.8 Hz, 3H)

Example 7: Solid Stability Tests of Crystal Form a Under High Temperature and High Humidity Conditions Two samples of Crystal Form A were weighed in parallel, each about 100 mg, placed on the bottom of a glass sample bottle and spread into a thin layer. The samples were sealed with aluminum foil paper, and some small holes were pierced in the aluminum foil paper to ensure that the sample can fully contact with the ambient air. The samples were placed at a constant temperature and humidity box under the condition of 40° C./75% humidity. The samples under the above conditions were sampled and tested on day 30, and the test results were compared with the initial test result on day 0. The test results were shown in Table 5 below:

TABLE 5

Solid stability test of Crystal Form A

| Time point (day) | Appearance | Crystal Form | Content (%) | Total impurity (%) |
|---|---|---|---|---|
| 0 | White powder | Crystal Form A | 99.61 | 0.39 |
| 30 | White powder | Crystal Form A | 99.59 | 0.45 |

Conclusion: Crystal Form A of the compound of formula (I) has good stability and is easy for medicine manufacture.

Example 8: Solid Physical Stability Tests of Crystal Form a Under Different Temperature, Humidity and Light Conditions Four samples of Crystal Form A were weighed in parallel, each about 100 mg, placed on the bottom of a glass sample bottle and spread into a thin layer. The samples were sealed with aluminum foil paper, and some small holes were pierced in the aluminum foil paper to ensure that the sample can fully contact with the ambient air. Four prepared samples were placed in 25° C./92.5% relative humidity, 60° C., 40° C./75% and light conditions, respectively, and the physical stability of the samples on the 10$^{th}$ day was investigated. At the same time, a sample of about 100 mg of Crystal Form A was weighed separately, placed on the bottom of the glass sample bottle, sealed with a screw cap, and stored at −20° C. for use as control. On the 10$^{th}$ day, all the samples were taken out, returned to room temperature, and the appearance changes of the samples were observed. XRPD was used to detect the sample crystal forms. By comparing the accelerated samples with the control sample, the solid physical stability of Crystal Form A of the compound of formula (I) was determined. The following Table 6 showed the results of the solid physical stability experiment of Crystal Form A.

TABLE 6

Solid physical stability tests of Crystal Form A under different temperature and humidity conditions and under light

| Item | Time point | −20° C. sealed (control) | 25° C./92.5% relative humidity (open) | 60° C. (open) | 40° C./75% relative humidity (open) | light |
|---|---|---|---|---|---|---|
| Crystal Form | Day 10 | Crystal Form A | Crystal Form A | Crystal Form A | Crystal Form A | Crystal Form A |

Conclusion: Crystal Form A of the compound of formula (I) has good stability and is easy for medicine manufacture.

Example 9: Solid Physical Stability Tests of Crystal Form B Under High Temperature, High Humidity and Light Conditions Two samples of Crystal Form B were weighed in parallel for each group, placed on the bottom of a glass sample bottle and spread into a thin layer. The samples were sealed with aluminum foil paper, and some small holes were pierced in the aluminum foil paper to ensure that the sample can fully contact with the ambient air. The samples were placed in a constant temperature and humidity or light box under different humidity conditions. The samples placed under the above conditions were sampled and tested on day 5, day 10, day 30, 1 month, 3 month or 6 month. The test results were compared with the initial test results on day 0. The test results were shown in Table 7-11 below:

TABLE 7

Solid high temperature stability test of Crystal Form B at 60° C.

| Time point (day) | Crystal Form | Content (%) | Total impurity (%) |
|---|---|---|---|
| 0 | Crystal Form B | 99.0 | 0.42 |
| 5 | Crystal Form B | 101.5 | 0.43 |
| 10 | Crystal Form B | 101.6 | 0.39 |
| 30 | Crystal Form B | 99.4 | 0.41 |

Conclusion: Crystal Form B of the compound of formula (I) has good high temperature stability and is easy for medicine manufacture.

TABLE 8

Solid high humidity stability test of Crystal Form B at 25° C./92.5% RH

| Time point (day) | Crystal Form | Content (%) | Total impurity (%) |
|---|---|---|---|
| 0 | Crystal Form B | 99.0 | 0.42 |
| 5 | Crystal Form B | 98.9 | 0.44 |
| 10 | Crystal Form B | 100.1 | 0.41 |
| 30 | Crystal Form B | 99.7 | 0.41 |

Conclusion: Crystal Form B of the compound of formula (I) has good high humidity stability and is easy for medicine manufacture.

TABLE 9

Solid light stability test of Crystal Form B

| Time point (day) | Crystal Form | Content (%) | Total impurity (%) |
|---|---|---|---|
| 0 | Crystal Form B | 99.0 | 0.42 |
| 5 | Crystal Form B | 101.0 | 0.44 |
| 10 | Crystal Form B | 100.7 | 0.42 |

Conclusion: Crystal Form B of the compound of formula (I) has good light stability.

TABLE 10

Solid stability test of Crystal Form B at 40° C./75% RH

| Time point (day) | Crystal Form | Content (%) | Total impurity (%) |
|---|---|---|---|
| 0 | Crystal Form B | 99.0 | 0.42 |
| 1 month | Crystal Form B | 100.6 | 0.45 |
| 2 month | Crystal Form B | 100.4 | 0.42 |
| 3 month | Crystal Form B | 98.8 | 0.44 |
| 6 month | Crystal Form B | 99.8 | 0.43 |

Conclusion: Crystal Form B of the compound of formula (I) has good stability and is easy for medicine manufacture.

TABLE 11

Solid stability test of Crystal Form B at 25° C./65% RH

| Time point (day) | Crystal Form | Content (%) | Total impurity (%) |
|---|---|---|---|
| 0 | Crystal Form B | 99.0 | 0.42 |
| 3 month | Crystal Form B | 98.4 | 0.45 |
| 6 month | Crystal Form B | 99.8 | 0.43 |

Conclusion: Crystal Form B of the compound of formula (I) has good stability and is easy for medicine manufacture.

Experimental Example 1: In Vitro Evaluation $IC_{50}$ values were determined to evaluate the inhibitory activity of the test compound on human ATR kinase.

ATR/ATRIP(h) was incubated in an assay buffer containing 50 nM GST-cMyc-p53 and Mg/ATP (concentration as required). The reaction was initiated by adding a Mg/ATP mixture. After incubation for 30 min at room temperature, a stop solution containing EDTA was added to terminate the reaction. Finally, the detecting buffer containing the $d^2$-labeled anti-GST monoclonal antibody and the europium-labeled anti-phospho Ser15 antibody against phosphorylated $p^{53}$ were added. Then, the plate in time-resolved fluorescence mode was read and homogeneous time resolution was performed.

The fluorescence (HTRF) signal was determined according to the formula: $HTRF=HTRF=10000\times(Em665\ nm/Em620\ nm)$.

XLFit version 5.3 (ID Business Solutions) was used to analyze $IC_{50}$ data. Nonlinear regression analysis was used to fit the S-shaped dose response (variable slope) curve. The test result was shown in Table 12:

TABLE 12

In vitro screening test result of the present compound

| Compound No. | ATR average $IC_{50}$(nM) |
|---|---|
| Compound of formula (1) | 29 |

Conclusion: The present compound of formula (1) has a good inhibitory effect on kinase ATR.

Experimental Example 2: In Vitro Cell Viability Test

The effect of the compound on inhibiting cell proliferation was investigated in this test by detecting the effect of the compound on cell activity in vitro in tumor cell lines LoVo. Celltiter-Glo Cell Viability Detection by Luminescence Method The following steps were carried out in accordance with the instructions of the Promega CellTiter-Gb Luminescence Cell Viability Detection Kit (Promega-G7573).

(1). The CellTiter-Glo buffer was melted and allowed to room temperature.
(2). The CellTiter-Glo substrate was allowed to room temperature.
(3). CellTiter-Glo buffer was added to a bottle of CellTiter-Glo substrate to dissolve the substrate to prepare CellTiter-Glo working solution
(4). Vortex was performed slowly for complete dissolution.
(5). The cell culture plate was taken out and placed for 30 min to equilibrate to room temperature.
(6). 50 μL (half volume of cell culture medium in each well) of CellTiter-Glo working solution was added to each well. The cell plate was wrapped with aluminum foil for protection from light.
(7). The culture plate was shaken on an orbital shaker for 2 min to induce cell lysis.
(8). The culture plate was allowed to stand at room temperature for 10 min to stabilize the luminescence signal.
(9). The luminescence signal was detected on the SpectraMax i3x of Molecular Devices plate reader.

Data Analysis

The following formula was used to calculate the inhibition rate (IR) of the test compound: IR (%)=(1−(RLU compound−RLU blank control)/(RLU vehicle control−RLU blank control))*100%.

The inhibition rates of different concentrations of compounds were calculated in Excel, and then GraphPad Prism software was used to draw the inhibition curve and calculate the relevant parameters, including the minimum inhibition rate, the maximum inhibition rate and $IC_{50}$.

The test results were shown in Table 13:

TABLE 13

In vitro LoVo cell proliferation inhibition test results

| | Compound of formula (1) |
|---|---|
| $IC_{50}$ (μM) | 0.51 |

Conclusion: The present compound of formula (1) TR has good inhibitory effect on LoVo tumor cells with mutation in the ATM signaling pathway.

Experimental Example 3: In Vivo Pharmacokinetic Properties Study

Test samples: On the basis of the above tests, some of these compounds with high activity and representative structures were selected for further tests.

Experimental procedure: The purpose of this study is to determine the pharmacokinetic parameters of the compound and calculate its gavage bioavailability in female Balb/c Nude mice.

Six female Balb/c Nude mice were used in this project, three mice were injected intravenously, with the dosage of 1 mg/kg, where plasma samples at 0 h (before administration) and at 0.0833, 0.25, 0.5, 1, 2, 4, 6, 8 and 24 h after administration were collected, and the other three mice were administered intragastrically with the dose of 10 mg/kg or 25 mg/kg, where plasma samples at 0 h (before administration) and at 0.5, 1, 2, 3, 4, 6, 8, 24 h after administration were collected. LC-MS/MS analysis was performed on the collected samples and data were collected. The collected analysis data were calculated with Phoenix WinNonlin 6.2.1 software for relevant pharmacokinetic parameters. The test results were shown in Table 14.1 and 14.2

| 14.1 Results of intravenous injection administration | |
|---|---|
| | Compound of formula (1) (1 mg/kg IV) |
| $C_0$ (nM) | 1955 |
| Cl (mL/min/kg) | 34.3 |
| $Vd_{ss}$ (L/kg) | 2.21 |
| $T_{1/2}$ (h) | 2.57 |
| AUC04 (nM · h) | 1087 |

| 14.2 Results of intragastric administration | |
|---|---|
| | Compound of formula (1) (10 mg/kg) |
| $C_{max}$ (nM) | 6500 |
| $T_{1/2}$ (h) | 2.02 |
| $AUC_{0-t}$ (nM · h) | 14983 |
| F (%) | 129.0 |

Note: $C_0$ (nM) is the concentration of the drug in the body at 0 min; Cl (mL/min/kg) is the clearance rate of the drug in the body; $Vd_{ss}$ (L/kg) is the volume of distribution of the drug in the body; $T_{1/2}$ (h) is the half-life; $AUC_{0-t}$ (nM·h) is the amount of drug exposure in the body; $C_{max}$ (nM) is the highest concentration of the drug in the body; F is the bioavailability.

Conclusion: the present compound of formula (1) has good absorption and exposure in intragastric administration and is suitable for oral administration.

Experimental Example 4: Colorectal Cancer LoVo CDX In Vivo Efficacy Study

Purpose: LoVo is a colorectal adenocarcinoma tumor cell with MRE11A mutation (MRE11A is a key component of the ATM signaling pathway for DNA double-strand break repair), which is sensitive to ATR inhibitor. This test use the LoVo CDX model of rectal cancer to verify the inhibitory effect of ATR inhibitor on a tumor with defective ATM signaling pathway.

Experimental Procedure:

1. Experimental Animals

Species: Mouse
Strain: BALB/c nude mice
Supplier Beijing Weitong Lihua Laboratory Animal Technology Co., Ltd.
Week age and weight: 6-8 weeks old, 18-22 g
Gender: female 2. Cell Culture Human colon cancer LoVo cells (ECACC, Catalog: 87060101), in vitro monolayer culture, culture conditions were Ham's F-12 medium with 10% fetal bovine serum, 100 U/mL penicillin, 100 μg/mL streptomycin and 2 mM glutamine, 37° C., 5% $CO_2$ culture.

Pancreatin-EDTA was used for routine digestion and passage twice a week. When the cell saturation was 80%-90%, the cells were collected, counted, and seeded. 0.1 mL ($10 \times 10^6$) of LoVo cells were subcutaneously inoculated on the right back of each nude mouse, and group administration was initiated when the average tumor volume reached 173 $mm^3$.

3. Preparation of Test Substance and Dosage 25.51 mg of compound of formula (1) was weighed and dissolved in 0.500 mL of DMSO. 2.000 mL of propylene glycol and 2.500 mL of deionized water were added, which was vortexed and mixed well and adjusted to pH=6.0 to give a clear solution.

Dosage: 25 mg/kg of all test compounds were administered by gavage twice a day, with an interval of 8 h within a day.

4. Tumor Measurement and Experimental Indicators

The diameter of the tumor was measured with a vernier caliper twice a week. The calculation formula for the tumor volume: $V=0.5a \times b^2$, where a and b represent the long diameter and short diameter of the tumor, respectively.

The anti-tumor efficacy of the compound was evaluated by TGI (%) or relative tumor proliferation rate T/C (%).

Relative tumor proliferation rate T/C (%)=TRTV/CRTV× 100% (TRTV: average RTV of the treatment group; CRTV: average RTV of the negative control group). According to the results of tumor measurement, the relative tumor volume (RTV) was calculated, and the calculation formula was RTV=Vt/V0, where V0 is the tumor volume measured at the time of group administration (i.e., D0), Vt is the tumor volume at a certain measurement, and TRTV and CRTV use the data at the same day.

TGI (%) represents the tumor growth inhibition rate. TGI (%)=[1-(average tumor volume at the end of a certain treatment group−average tumor volume at the beginning of the treatment group)/(average tumor volume at the end of treatment in the solvent control group−average tumor volume at the beginning of treatment in the solvent control group)]×100%.

After the experiment was completed, the tumor weight was detected and the percentage of T/C weight was calculated, where T weight and C weight represent the tumor weight of the administration group and the vehicle control group, respectively.

5. Test Results

The efficacy of the compound in the human colorectal cancer xenograft tumor model was evaluated in this test, with the solvent control group as the reference. At day 17 of administration, the compound of formula (1) (25 mg/kg) group had T/C and TGI of 27.8% and 90.7%, respectively, as compared to the vehicle control group

6. Conclusion

In this experiment, the present compound of formula (1) shows inhibitory effect on the growth of human colorectal cancer LoVo cell subcutaneous xenograft tumor-bearing mice.

The invention claimed is:
1. A crystal form of a compound of formula (I):

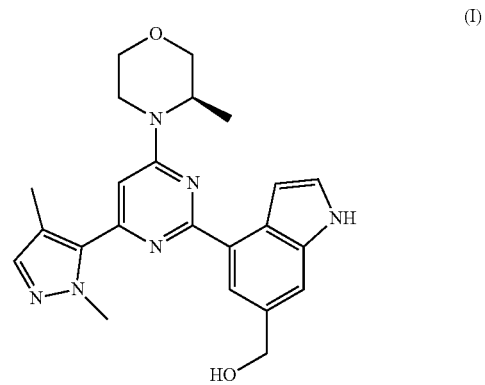 [SMILES: Cc1cnn(C)c1-c1cc(N2CCOC[C@H]2C)nc(-c2cc(CO)cc3[nH]ccc23)n1]

which is selected from the group consisting of:
(1) Crystal Form A, wherein,
the Crystal Form A has an X-ray powder diffraction pattern having characteristic diffraction peaks at the following 2θ angles: 8.10±0.20°, 18.33±0.20° and 22.63±0.20°;
(2) Crystal Form B, wherein,
the Crystal Form B has an X-ray powder diffraction pattern having characteristic diffraction peaks at the following 2θ angles: 8.45±0.20°, 10.87±0.20° and 20.56±0.20°.
2. The crystal form according to claim 1, which is
the Crystal Form A having an X-ray powder diffraction pattern having characteristic diffraction peaks at the following 2θ angles: 7.46±0.20°, 8.10±0.20°, 13.03±0.20°, 15.07±0.20°, 15.58±0.20°, 16.19±0.20°, 18.33±0.20° and 22.63±0.20°.
3. The crystal form according to claim 2, wherein,
the Crystal Form A has an X-ray powder diffraction pattern having characteristic diffraction peaks at the following 2θ angles: 7.46±0.20°, 8.10±0.20°, 13.03±0.20°, 13.46±0.20°, 15.07±0.20°, 15.58±0.20°, 16.19±0.20°, 18.33±0.20°, 21.17±0.20° and 22.63±0.20°.
4. The crystal form according to claim 3, wherein,
the Crystal Form A has an X-ray powder diffraction pattern having characteristic diffraction peaks at the following 2θ angles: 7.46°, 8.10°, 11.24°, 13.03°, 13.46°, 15.07°, 15.58°, 15.98°, 16.19°, 17.70°, 18.33°, 19.60°, 21.17°, 22.63°, 23.84°, 25.56° and 26.57°.
5. The crystal form according to claim 4, wherein,
the Crystal Form A has an XRPD pattern as shown in FIG. 1.
6. The crystal form according to claim 1, which is
the Crystal Form B having an X-ray powder diffraction pattern having characteristic diffraction peaks at the following 2θ angles: 8.45±0.20°, 10.87±0.20°, 14.83±0.20°, 15.54±0.20°, 17.33±0.20°, 20.56±0.20°, 22.00±0.20° and 22.63±0.20°.
7. The crystal form according to claim 6, wherein,
the Crystal Form B has an X-ray powder diffraction pattern having characteristic diffraction peaks at the following 2θ angles: 8.45±0.20°, 10.87±0.20°, 14.83±0.20°, 15.54±0.20°, 17.33±0.20°, 20.08±0.20°, 20.56±0.20°, 22.00±0.20°, 22.63±0.20° and 25.26±0.20°.

8. The crystal form according to claim 7, wherein,
the Crystal Form B has an X-ray powder diffraction pattern having characteristic diffraction peaks at the following 2θ angles: 8.45°, 9.20°, 10.87°, 12.57°, 14.14°, 14.53°, 14.83°, 15.54°, 16.80°, 17.33°, 18.43°, 19.84°, 20.08°, 20.56°, 21.39°, 22.00°, 22.44°, 22.63°, 23.26°, 25.26°, 25.85° and 26.98°.

Figure 2:
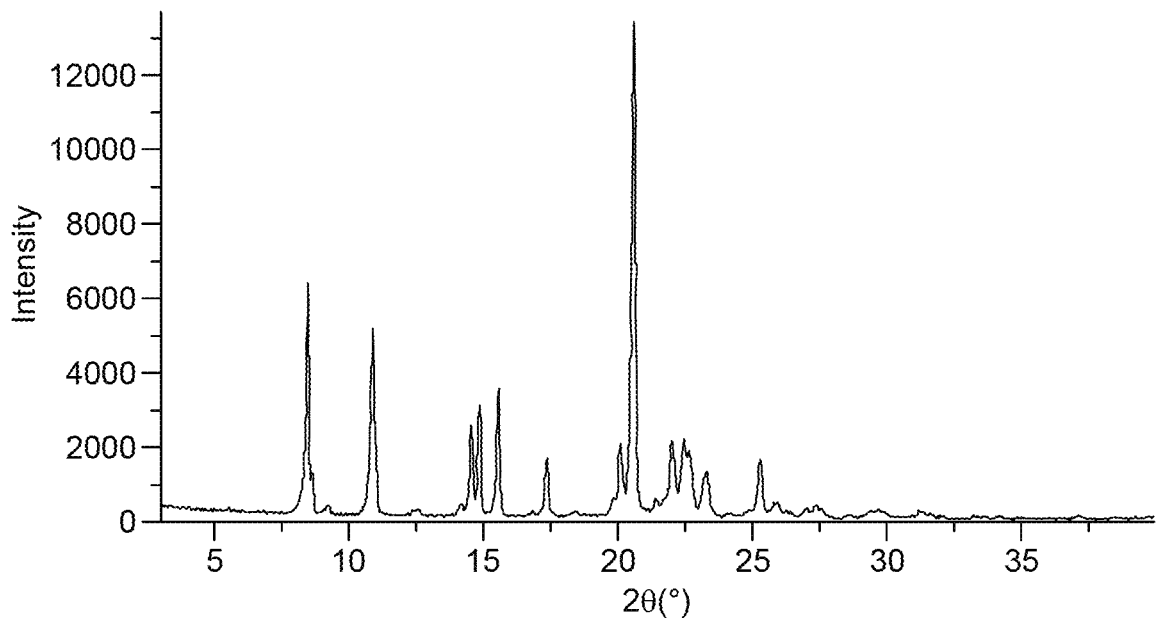
FIG. 2 shows the XRPD pattern at Cu-Kα radiation of the Crystal Form B of the compound of Formula (I)

9. The crystal form according to claim 8, wherein,
the Crystal Form B has an XRPD pattern as shown in FIG. 2.

10. The crystal form according to claim 1, which is
the Crystal Form B having a Differential Scanning Calorimetry curve (DSC) having one onset point of endothermic peak at 174.3±3° C.

Figure 3:
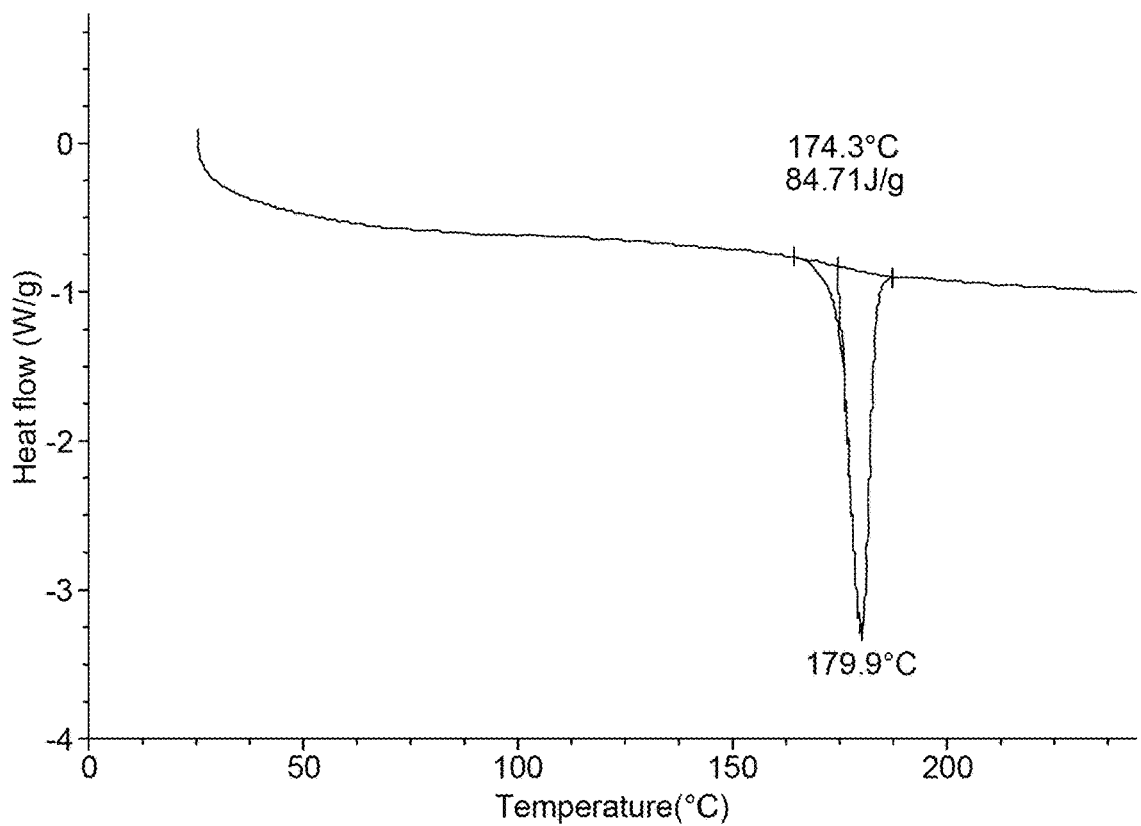
FIG. 3 shows the DSC pattern of the Crystal Form B of the compound of Formula (I)

11. The crystal form according to claim 10, wherein,
the Crystal Form B has a DSC pattern as shown in FIG. 3.

12. The crystal form according to claim 1, which is
the Crystal Form B having a Thermogravimetric Analysis curve (TGA), wherein the weight loss at 150°±3° C. is 1.49%.

Figure 4:
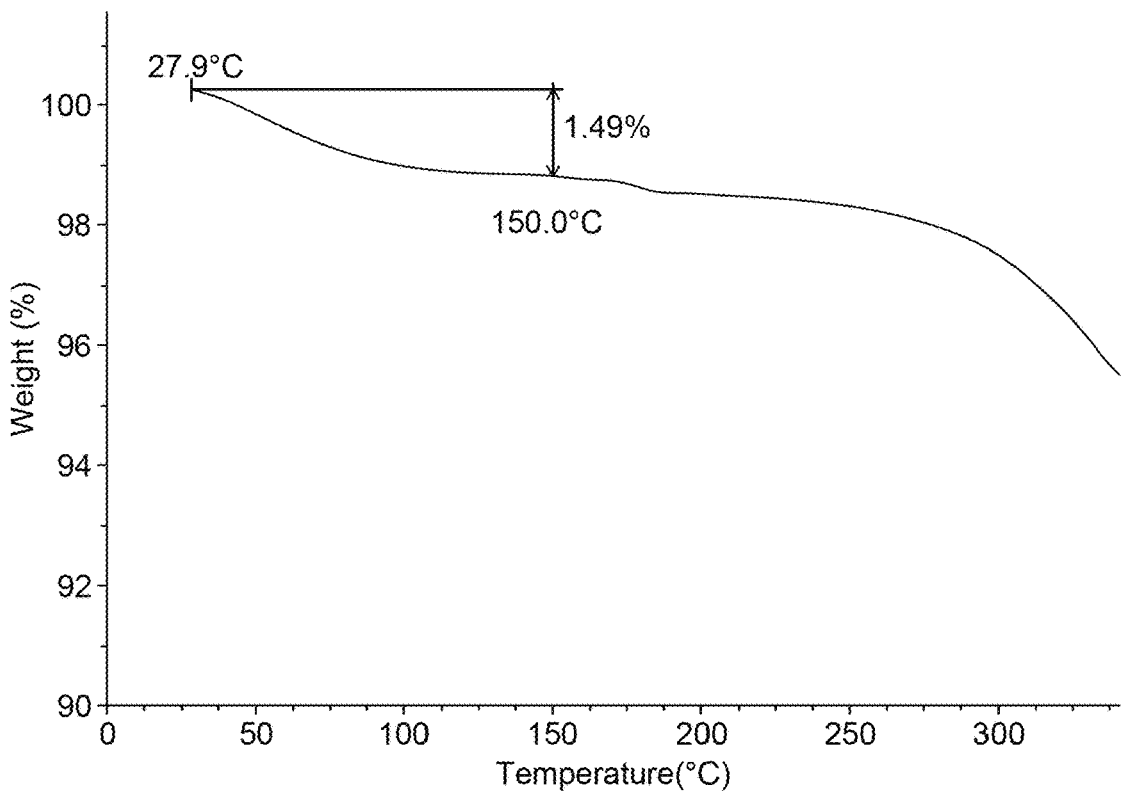
FIG. 4 shows the TGA pattern of the Crystal Form B of the compound of Formula (I).

13. The crystal form according to claim 12, wherein,
the Crystal Form B has a TGA pattern as shown in FIG. 4.

14. A process for preparing the Crystal Form A of the compound of formula (I) as defined in claim 1, comprising:
1) adding the compound of formula (I) into ethanol solvent;
2) adding water;
3) stirring for 100-120 h;
4) performing recrystallization at room temperature to obtain the Crystal Form A.

15. A process for preparing the Crystal Form B of the compound of formula (I) as defined in claim 1, comprising:
1) adding the compound of formula (I) into a solvent;
2) heating to a temperature with stirring for 2.5-120 h;
3) performing recrystallization at room temperature to obtain the Crystal Form B.

16. The process according to claim 15, wherein
the solvent is methanol, methyl tertiary butyl ether, methanol/water (VN, 1:0.3-1), acetone/water (V/V, 1:1), isopropanol/water (V/V, 1:1), ethyl acetate/n-heptane (V/V, 1:1), isopropyl acetate/n-heptane (V/V, 1:1), ethanol/n-heptane (V/V, 1:1), acetonitrile/n-heptane (V/V, 1:1), isopropanol/n-heptane (V/V, 1:1) or dichloromethane/n-heptane (V/V, 1:1).

17. The process according to claim 16, wherein
the temperature is 25-70° C.

18. The process according to claim 15, wherein
the concentration range of the compound of formula (I) is selected from the group consisting of 25 mg/mL-50 mg/mL.

19. A method for treating colorectal cancer, comprising administering the crystal form according to claim 1 to a subject in need thereof.

20. A pharmaceutical composition, comprising the crystal form according to claim 1.

* * * * *